(12) United States Patent
Vesavkar et al.

(10) Patent No.: US 10,093,036 B2
(45) Date of Patent: Oct. 9, 2018

(54) PROCESS FOR SEPARATING MATERIALS

(71) Applicant: Impact Laboratories Limited, Grangemouth (GB)

(72) Inventors: Surya Vesavkar, Edinburgh (GB); Steven Andrew Burns, Brightons (GB); Ian Vallance, Cumbernauld (GB)

(73) Assignee: IMPACT LABORATORIES LTD. (GB)

( * ) Notice: Subject to any disclaimer, the term of this patent is extended or adjusted under 35 U.S.C. 154(b) by 0 days.

(21) Appl. No.: 15/328,532

(22) PCT Filed: Jul. 27, 2015

(86) PCT No.: PCT/GB2015/052162
§ 371 (c)(1),
(2) Date: Jan. 24, 2017

(87) PCT Pub. No.: WO2016/016623
PCT Pub. Date: Feb. 4, 2016

(65) Prior Publication Data
US 2017/0203470 A1    Jul. 20, 2017

(30) Foreign Application Priority Data

Jul. 27, 2014 (GB) .................................. 1413283.1
Oct. 10, 2014 (GB) .................................. 1417972.5

(51) Int. Cl.
*B03B 5/00* (2006.01)
*B29B 17/02* (2006.01)
(Continued)

(52) U.S. Cl.
CPC ................ *B29B 17/02* (2013.01); *B03B 5/02* (2013.01); *B03B 5/28* (2013.01); *B03B 5/36* (2013.01);
(Continued)

(58) Field of Classification Search
CPC .............. B03B 5/02; B03B 5/36; B29B 17/02
(Continued)

(56) References Cited

U.S. PATENT DOCUMENTS 2,156,953 A * 5/1939 Nelson .................... F25B 37/00
62/110
3,076,547 A * 2/1963 Bodine Jr. ............... B01J 19/10
209/1

(Continued)

FOREIGN PATENT DOCUMENTS

DE           445 663 C      6/1927
DE           445663 C   *   6/1927   ............... B03B 5/14
(Continued)

OTHER PUBLICATIONS

United Kingdom Intellectual Property Office, Search Report for GB1417972.5, dated Mar. 26, 2015, entire document, United Kingdom.
(Continued)

*Primary Examiner* — Terrell H Matthews
(74) *Attorney, Agent, or Firm* — Law Office of Jesse D. Lambert, LLC (57) ABSTRACT

A process for separating a mixture of materials using a segregation media within a vessel having a central baffle structure which shuggles the mixture by oscillating the baffle structure at a frequency and amplitude. The mixture of materials may have overlapping densities with the segregation media having a density within the overlapping region. Polymers PE and PP may be separated in flake form. For a mixture of materials of differing densities, water may be the segregation media. Shuggling is combined with controlling the flow of water through the vessel at a set velocity. Embodiments are described for separating plastics and mineral ore.

16 Claims, 3 Drawing Sheets

(51) Int. Cl.
*B03B 5/02* (2006.01)
*B03B 5/28* (2006.01)
*B03B 5/36* (2006.01)
*B29K 23/00* (2006.01)

(52) U.S. Cl.
CPC ............. *B29B 2017/0203* (2013.01); *B29B 2017/0217* (2013.01); *B29B 2017/0244* (2013.01); *B29K 2023/06* (2013.01); *B29K 2023/12* (2013.01); *Y02W 30/524* (2015.05); *Y02W 30/622* (2015.05)

(58) Field of Classification Search
USPC .......................................... 209/446, 448, 422
See application file for complete search history.

(56) References Cited

U.S. PATENT DOCUMENTS

| | | | | |
|---|---|---|---|---|
| 3,903,000 | A | * | 9/1975 | Miura ............... B01D 21/0006 209/437 |
| 4,073,661 | A | | 2/1978 | Buzga et al. |
| 4,132,633 | A | | 1/1979 | Saitoh et al. |
| 4,162,880 | A | | 7/1979 | Cobbs, Jr. et al. |
| 4,163,723 | A | * | 8/1979 | Romano ............... B03B 5/36 209/159 |
| 4,244,531 | A | | 1/1981 | Szegvari |
| 4,809,854 | A | | 3/1989 | Tomaszek |
| 5,057,211 | A | * | 10/1991 | Baummer ............... B03B 5/02 209/448 |
| 5,358,119 | A | | 10/1994 | Stahl et al. |
| 5,370,235 | A | | 12/1994 | Stahl et al. |
| 5,840,198 | A | * | 11/1998 | Clarke ............... B01D 17/0211 210/802 |
| 5,894,996 | A | * | 4/1999 | Williams ............... B03B 5/28 209/172 |
| 6,555,588 | B2 | | 4/2003 | Gorski et al. |
| 6,599,950 | B2 | | 7/2003 | Jody et al. |
| 7,950,525 | B2 | * | 5/2011 | Koslow ............... B03B 5/20 209/162 |
| 8,646,705 | B2 | * | 2/2014 | Coates ............... B02C 19/06 241/5 |
| 2008/0110806 | A1 | | 5/2008 | Koslow |
| 2008/0219091 | A1 | | 9/2008 | Haughton |
| 2009/0245015 | A1 | | 10/2009 | Ni et al. |
| 2009/0304890 | A1 | | 12/2009 | Ni et al. |
| 2010/0124145 | A1 | | 5/2010 | Ni et al. |
| 2010/0216631 | A1 | | 8/2010 | Ni et al. |
| 2014/0255575 | A1 | * | 9/2014 | Bhushan ............... A23N 4/24 426/484 |

FOREIGN PATENT DOCUMENTS

| | | | | |
|---|---|---|---|---|
| EP | | 0631809 A1 | * 1/1995 | ......... B01F 11/0071 |
| EP | | 1 161 302 B1 | 2/2004 | |
| JP | | 2000 301023 A | 10/2000 | |
| JP | | 2006 281184 A | 10/2006 | |
| WO | WO | 2005/075085 A1 | 8/2005 | |
| WO | WO | 2007/099354 A2 | 9/2007 | |
| WO | WO | 2008/122812 A2 | 10/2008 | |

OTHER PUBLICATIONS

European Patent Office As International Search Authority, International Search Report for PCT/GB2015/052162, dated Dec. 11, 2015, entire document, Netherlands.

\* cited by examiner

PROCESS FOR SEPARATING MATERIALS

The present invention relates to a process for separating materials and more particularly, though not exclusively, to a process for separating materials based upon their densities by shuggling the materials in a segregation media under selected conditions. The process finds specific application in the separation of waste plastics and mineral extraction.

Recycling of waste materials has now become a major environmental driver. In this regard the recycling of plastics is placed high on the agenda as these are non-biodegradable. To recycle plastics requires the plastics waste to be capable of being separated into the chemically distinct materials. As a result many techniques have been proposed, primarily based on separating the different plastics by their density. Consequently, the known techniques use either gravity separation in flotation tanks or stirring to create a centrifugal force for separation. These techniques cannot separate lower value (non bottle) 'mixed plastics' which currently can only be separated by expensive IR or optical technology.

The most common plastics in waste are the polyolefins polyethylene (PE) and polypropylene (PP). In recycling they only have a value when the pure materials are recovered. Unfortunately as the density of PE lies between 0.92 and 0.97 g/cm$^3$, and that of PP lies between 0.9 and 0.91 g/cm$^3$, the abovementioned standard techniques cannot provide sufficient segregation to recover PE and PP with sufficient purity for recycling.

Some success has been found in separating PE and PP by using processes employing electrostatic charging; bubbling gas through the mixture; dissolving a part of the mixture; and passing through multiple flotation tanks.

The application of novel and efficient separation techniques to the mineral extraction-processing is of paramount importance due to the constant need of dividing the valuable minerals from the waste minerals upon ores extraction. Ore is a term used to describe an aggregate of minerals from which a valuable constituent, especially a metal, can be profitably mined and extracted. Most rock deposits contain metals or minerals, but when the concentration of valuable minerals or metals is too low to justify mining, it is considered a waste or gangue material. Within an ore body, valuable minerals are surrounded by gangue and it is the primary function of mineral processing, to liberate and concentrate those valuable minerals.

Several techniques have been applied in order to separate the valuable minerals: Sorting, based on appearance, colour, texture, optical properties and radioactivity; Gravity and Dense-Medium Separation, being separation based on specific gravity of the valuable mineral relative to the gangue and the segregation media e.g. water or for dense-medium separation, a mixture of water, magnetite, or ferrosilicon; Magnetic Separation, with separation based upon natural or induced differences in magnetic susceptibility of the minerals within the ore; and Froth Flotation, giving separations based on the surface chemistry properties of a mineral as the natural or modified surface property of the mineral determines its ability to attach to an air bubble and float to the surface.

Dense medium separation relies not only the difference between the specific gravity of the particles but also exploits the variation in the effective of specific gravity (SG) of a fluid medium. Chemicals are often used for lab scale separations while dense medium slurries are used more on an industrial scale. Typical dense mineral separators are: Pinched Sluices, The reichert cone concentrator, Spiral concentrators, jigs and centrifuge gravity concentrators.

It is an object of the present invention to provide a process for the separation of materials in a mixture of materials of chemically different type and density which does not use a process employing standard gravity separation; creating a centrifugal force; electrostatic charging; bubbling gas through the mixture; dissolving any part of the mixture; or multiple flotation tanks.

It is an object of at least one embodiment of the present invention to provide a process for the separation of plastic particles of a mixture of plastics of chemically different type which is cheaper in terms of capital and maintenance compared to prior art separation systems, particularly those using IR and optical technology.

It is an object of the present invention to provide a process for the separation of materials in a mixture of materials which can be performed as a continuous, semi continuous or fed-batch process.

According to a first aspect of the present invention there is provided a process for the separation of materials in a mixture of materials, comprising:
a) introducing a mixture of at least two materials of chemically different type into a vessel;
b) introducing a segregation media to the vessel;
c) oscillating a centrally located baffle structure in the vessel at a first frequency and a first amplitude; and
d) causing shuggling in the vessel through the oscillating baffle structure so as to result in separation of the at least two materials within the vessel.

The present applicants have surprisingly discovered that shuggling the mix using a centrally located oscillating baffle causes separation. This is in contrast to the known stir tank reactors where a mechanically agitated impeller causes mixing of components e.g. for polymerisation and crystallization. Shuggling may be considered as a form of agitation, though it is distinct in that it does not include stirring which is typical of agitation. Shuggling may be considered as shaking.

Additionally, it has been found that the first amplitude and first frequency can be selected to assist in separation of the materials. In an embodiment, the first amplitude and/or the first frequency may be varied, in use, to improve separation. In this way, the frequency may be increased as separation begins to increase efficiency.

Preferably, the segregation media is circulated through the vessel. More preferably, the segregation media is drawn out of a base of the vessel and recirculated back to a top of the vessel. Alternatively, the segregation media is drawn out of a top of the vessel and recirculated back to the bottom of the vessel. The direction is chosen to apply a counter current of the segregation media. It has been found that the speed of the circulation can also be used to assist in separation of the materials.

Preferably the baffle structure comprises a central shaft upon which are located a plurality of discs, the discs including one or more pathways therethrough for the passage of vessel contents. In this way, the discs induce movement to the mixture and the segregation media while still providing a route through which the materials can move to either end of the vessel. It has been found that varying the number and size of pathways through the discs can be used to assist in separation of the materials. It has also been found that varying the separation between the discs can assist in separation of the materials.

Preferably the segregation media is a fluid. More preferably, the segregation media is a liquid. In an embodiment, the segregation media is water. The segregation media may be selected from a group comprising: solvent blends, isopropyl alcohol or a salt solution.

Preferably, the mixture includes at least a first material having a first density in a first density range and at least a second material having a second density in a second density range. In a first embodiment, the first and second density ranges overlap and the segregation media has a density within the overlap. It has been found that the process provides for separation of materials with overlying density ranges. When the mixture is shuggled, the lighter material will move to the top of the vessel and the heavier material will move to the bottom of the vessel.

In the first embodiment, the materials are polyolefins polyethylene (PE) and polypropylene (PP). In this way, the difficult to separate PE and PP in waste plastic mixtures can be separated. Preferably, the mixture is a shredded mixture. More preferably, the shredded mixture is in the form of flakes. More preferably, the mixture includes 2D flakes which may be considered as thin films i.e. a thickness of <50 microns. Thus the separation of plastic thin films can be achieved with the present invention. It is believed that by rapidly moving the 2D flakes under oscillation, static friction forces cannot build up between 2D flakes which would otherwise hold them together and prevent separation.

In the first embodiment, the process may include a pre-separation stage to provide a mixture of materials having overlapping density ranges. For waste plastics, the shredded mixture may initially be separated into high density and low density plastics to provide a mixture with approximately the same density range. Any known process may be used to do the initial separation such as those processes discussed in the prior art. Alternatively, the pre-separation stage may be achieved with the same apparatus of the present invention, but with an appropriate segregation media i.e. one who's density lies between the high and low density values of the plastics being separated.

In a second embodiment, the first and second density ranges are distinct and the segregation media has a greater density than the first and second density ranges. It has been found that in shuggling, the first and second materials will float and separate to form a stack at the top of the vessel.

In a third embodiment, the first and second density ranges are distinct and the segregation media has a lower density than the first and second density ranges. It has been found that in shuggling, the first and second materials will sink and separate to form a stack at the bottom of the vessel.

In this way, separation has been found to occur without requiring the separation media to have a density between the materials being separated. This advantageously allows cheaper segregation media, such as water to be used.

The mixture may include minerals. Alternatively or additionally, the mixture may include metals. In an embodiment the mixture is ore. In this way the valuable minerals and metals can be extracted using the present invention.

Preferably, the segregation media is degassed prior to introduction into the vessel. This is in contrast to prior art techniques where gas bubbles are introduced to the vessel. Degassing the segregation media has been found to improve the efficiency of separation. More preferably, the vessel is operated at negative pressure. With the degassing this can also improve efficiency of separation.

Preferably the baffle structure is oscillated by use of a motor located at an end of the shaft. In this way the shaft is stroked at the amplitude and the frequency to shuggle the vessel contents.

There may be a plurality of vessels arranged to provide cascaded segregation. The segregation media may be varied between the vessels to improve segregation. The amplitude and frequency may also vary between the vessels.

Alternatively, there may be a plurality of baffle structures in a single vessel. More preferably, the baffle structures are spaced apart along a tank-shaped vessel, between an input and an output at opposite ends. In this embodiment 'centrally located' means away from walls of the vessel. The baffle structures may be arranged in an array. Preferably, the tank-shaped vessel is on an incline. This assists in passage of the recirculating segregation media. More preferably there are two outputs, one at a top of the vessel and one at a bottom of the vessel. In this way, the separated materials can be pumped out of the vessel.

Preferably the process includes means for removing a separated material from the vessel. The means may remove the material from the top or bottom of the vessel. The means may include removing a material from a stack of materials. Such means may be by skimmers, vacuum suction, water flows or other techniques which provide for the removal of a layer of material in the vessel.

Embodiments of the present invention will now be described, by way of example only, with reference to the following drawings of which.

Figure 1:
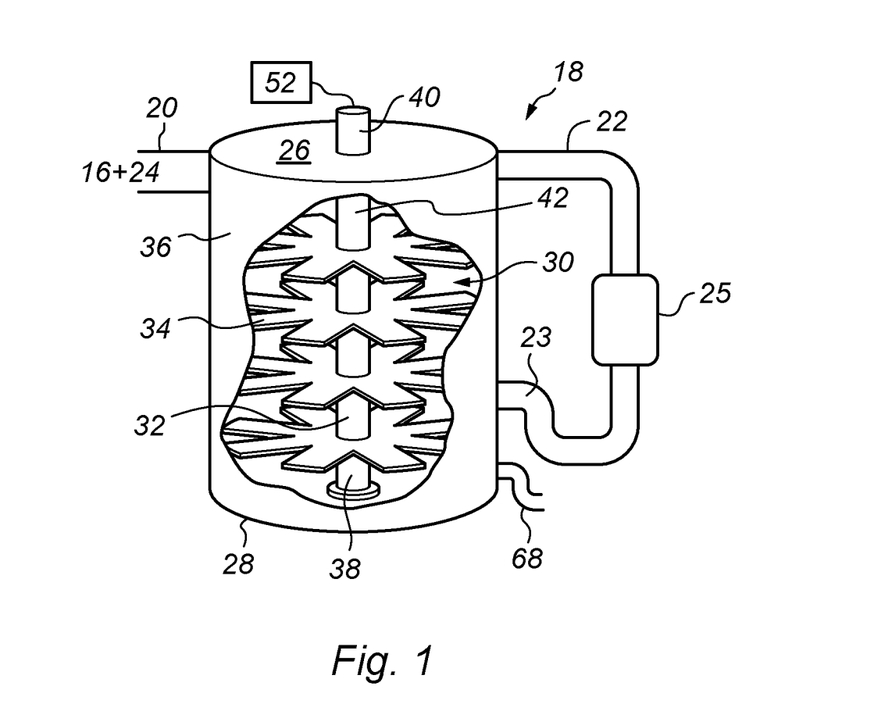
FIG. 1 a perspective view of a vessel in which a portion has been broken away to show a baffle structure for use in a process for separating materials according to an embodiment of the present invention.

Reference is initially made to FIG. 1 of the drawings which illustrates apparatus for use in a process, generally indicated by reference numeral 10, for the separation of a mixture of at least a first material 12 and at least a second material 14, according of the present invention.

The materials 12,14 are preferably particles of chemically different types with the first material having a first density in a first density range and the second material having a second density in a second density range. The mixture 16 is fed into a vessel 18 along with a segregation media. The segregation media is a liquid, preferably water. In a first embodiment, the first and second density ranges overlap and the segregation media has a density within the overlap. In a second embodiment, the first and second density ranges are distinct and the segregation media has a greater density than the first and second density ranges. In a third embodiment, the first and second density ranges are distinct and the segregation media has a lower density than the first and second density ranges. In this way, separation can occur without requiring the separation media to have a density between the materials being separated. This advantageously allows the cheaper segregation media, water to be used.

The vessel 18 is substantially cylindrical having a height greater than its diameter. The capacity of the vessel can be arranged to suit the quantity of materials and can be scaled from a bench-top system of 500 ml to a tank of 10,000 to 20,000 liters easily. There is a first input port 20 through which the mixture 16 and is introduced. A second input port 22 is provided for the segregation media 24. The introduction of the mixture 16 and the segregation media 24 may be referred to as the filler step 46. The mixture 16 and the segregation media 24 may be mixed before being input through a single port, if desired. Separate input 22 for the segregation media 24 allows the segregation media to be removed via an output 23 and pumped 25 back to the input 22 for recirculation. The speed of the pump 25 can be varied.

Referring to FIG. 1, which illustrates a cut-away of the vessel 18, there is shown a baffle structure, generally indicated by reference numeral 30, vertically arranged in the centre of the vessel 18, and extending between the top 26 and bottom 28 of the vessel 18. Baffle structure 30 has a central shaft 32 upon which is located a number of discs 34(a)-(d). For illustrative purposes only four discs 34 are shown. The discs 34 are mounted perpendicularly to the shaft 32 so that they radiate out through the vessel 18 to almost reach the side wall 36. The number and position of the discs 34 may be varied on the shaft 32.

The base 38 of shaft 32 is supported on the bottom 28 of the vessel, but is in a sliding hold, which allows the shaft 32 to move longitudinally on its own central axis, vertically with respect to the vessel 18. The discs 34 are attached to the shaft 32 in such a way that they too, move longitudinally when the shaft 32 moves. Movement of the shaft 32, is achieved by use of an actuator linear movement motor 40 attached to the top end 42 of the shaft 42.

The motor 40 provides a linear movement to the shaft 32 on the central axis. The movement is a stroke, being a backward and forward motion, to extend the shaft 32 into the vessel by a set distance, referred to as the amplitude. The frequency of the strokes can also be set, so that the shaft 32 acts like a piston, continuously moving the discs 34 up and down within the vessel 18. The movement of the discs 34 within the vessel 18 shuggles the contents of the vessel 18, these being the mixture 16 and the segregation media 24. This shuggling step 48 can operate over a fixed time, it may be for short repeated pulses or can be stopped and started between checks to determine the degree of separation of the vessel contents. Note that the shaft 32 does not rotate so there is no stirring action.

The shuggling step 48 is controlled by circuitry 52 which operates the motor 40 and determines the amplitude and frequency required to obtain optimum separation. The amplitude and frequency determine the energy introduced to the process 10 and can be selected for particular mixtures. Note that the amplitude and frequency can be adjusted during separation.

Figure 2:
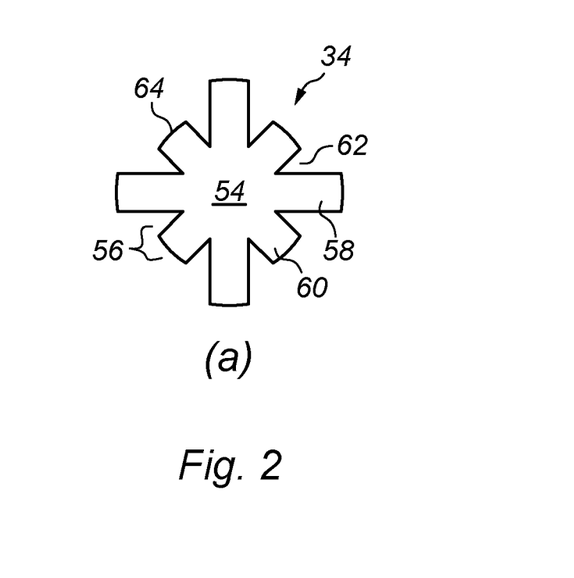
FIG. 2 shows a top view of a disc design used on the baffle structure of FIG. 1.

The vessel contents, being the mixture 16 and the segregation media 24, are shuggled by repeated contact with the discs 34. The discs 34 are designed to provide sufficient surface area 54 for contact with the vessel contents while still allowing the mixture 16 and the media 24 to move between the discs 34 via passageways 56. FIG. 2(a) shows an embodiment for a disc 34. Disc 2(a) is substantially circumferential with a star shaped configuration. Substantially rectangular long 58 and short 60 strips extend from the shaft 32 and are alternately and equidistantly spread out from the shaft 32. The space 62 between the strips 58,60 and the consequential space between the ends 64 of the short strips 60 and the side wall 36 of the vessel 18 provide the passageway 56 for movement of fluids through the vessel 18. The discs 34 may be of any shape and size, as long as they are proportional to the size of the vessel 18, with passageways for the movement of fluid which re again proportional to the size of the vessel 18.

The discs 34 are comparatively thin compared to the height of the vessel 18 and may be considered as blades, though as said previously, they are not rotated as would occur if the baffle structure 30 was an impeller in a mixing tank. Equally the baffle structure 30 of the present invention is in direct contrast to known baffle structures used in mixing tanks. Prior art baffle structures are typically vertically arranged bars or rods spaced equidistantly around the outer edge of the tank which are fixed in position and do not move during operation of the tank.

In an embodiment the discs 34 are equally spaced along the shaft 32. The spacing is based on the particle size of the materials being separated and is proportional to the size of the vessel 18. In an alternative embodiment the discs 34 are concentrated together at the centre of the vessel 18 and become spaced further apart towards the top 26 and bottom 28.

In the first embodiment, the first material 12 and second material 14 have first and second density ranges which are distinct or may overlap. The segregation media 24 has a density between the first and second density or within the overlap. In shuggling the mixture 48, the first material 12 and the second material 14 will separate with the heavier material 12 moving to the base 28 of the vessel 18 and the lighter material 14 moving to top of the vessel 18. A layer of segregation media 24 will be left between the material 12,14 layers. The shuggling facilitates the separation—ie it is faster and better separation (more pure) than no shuggling or just simple agitation. This separation step 50 allows the first material 12 to be first drawn off through an outlet 68 at the base 28 of the vessel 18. The segregation media 24 can also be drawn off and filtered for re-use or recirculated via the pump 25. Finally the second material 14 can be drawn off. The separated materials 12,14 can then be individually packed and transported to other manufacturing and process sites for new uses.

In the second embodiment, the first material 12 and second material 14 have first and second density ranges which are distinct and the segregation media 24 has a greater density than the first and second density ranges. In shuggling the mixture 48, the materials 12, 14 will float, rising to the top of the vessel 18. On rising the materials 12,14 will separate to provide a stack of materials 12,14 in two layers at the top of the vessel 18. These almost pure materials 12,14 can be drawn off separately from the vessel 18. The segregation media 24 can also be drawn off for re-use.

The corollary also applies. If a lower density of segregation media 24 is used compared to the two materials 12,14, on shuggling the mixture 48, the materials 12,14 will sink and separate into a stack of individual layers at the base of the vessel 18.

This advantageously means that any materials may be separated by water rather than the expensive, and often flammable, solvents used as segregation media in prior art separation processes.

The process 10 is suitable for the separation of waste plastics and, in particular, for the separation of polypropylene and polyethylene.

It is common for recyclable materials to be collected together and thus an initial sorting stage 44 may be required. This will generally consist of separating paper, metal and plastics. The plastics collected generally represent bottles, canisters, food trays, packaging and films of various thicknesses depending on their initial purpose. Each is made up of one or more plastics which need to be separated for re-use. Currently, many items are provided with identification, in the form of a number within a triangle of chasing arrows, to show the type of plastic of which they comprise. There are seven numbers, Polyethylene Terephthalate (PET) having the number 1; High Density Polyethylene (HDPE) having the number 2; Polyvinyl Chloride (PVC) having the number 3; Low Density Polyethylene (LDPE) and Linear Low Density Polyethylene (LLDPE) both having the number 4; Polypropylene (PP) having the number 5; Polystyrene (PS) having the number 6; with the number 7 being given to other miscellaneous plastics.

While some manual sorting can be done it is typical that an approach is required as described in the prior art. In this way, the risk of contamination is reduced. Plastics are normally shredded or ground to provide flakes of individual material which have dimensions of less than 5 mm, but for the films this may be less than 50 microns in thickness. Where the thickness is so small the flakes may be referred to as 2D in contrast to other 3D flakes. The flakes can be washed to remove any residues which adhered to them in use.

Separation of 2D flakes has proved difficult, particularly for processes reliant on the density of the plastic as the differentiator for separation. These 2D flaked films don't segregate very well mostly because the static friction between the flakes is so large it overcomes the natural segregating force arising from the density of the plastics. In the present invention, these 2D flakes can be separated.

Process 10 can begin with a pre-sorting stage 44 as described above which ultimately produces mixed plastic flakes 16 with densities of approximately the same range. Process 10 then continues with inputting mixed plastic flakes 16 into the vessel 18 at the filler stage 46.

In the preferred embodiment the mixed plastics 16 comprise polypropylene 12 and polyethylene 14, which may have been the residue recovered from an earlier stage separation which failed to distinguish these components due to their being approximately in the same range of density. The segregation media 24 is a fluid being isopropyl alcohol whose density may be varied by dilution with water.

The mixed plastics 16 and the segregation media 24 can be input to the vessel in any order as this has negligible effect on the separation process 10. The ratio of mixed plastics 16 to segregation media 24, however, does have an effect. Separation can occur in a much reduced time scale if the ratio of plastics 16 to media 24 is low. Separation has been shown to occur at ratios of 40% flake to 60% media, though the best results occur at flake loading of no more than 30%.

Figure 3:
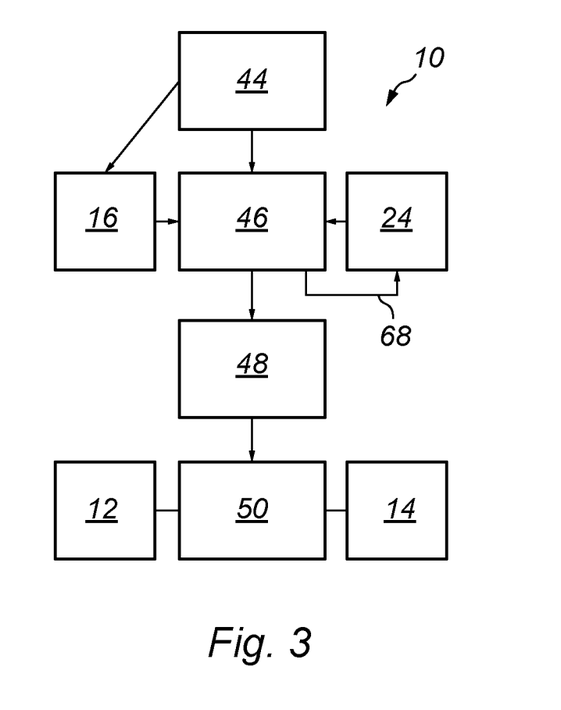
FIG. 3 is a diagrammatic view illustrating the steps in a process to separate plastics according to an embodiment of the present invention.

Referring to FIG. 3, the stages in the process 10 are presented. Following the filler stage 46 is the shuggling stage 48. The shuggling step 48 strokes the shaft 32 at a desired amplitude and frequency. This amplitude and frequency can be adjusted during separation. In this way, loosening of the plastic mixture 16 can be undertaken where the ratio of plastic mix 16 to segregation media 24 is higher, at a first frequency, and then separation can be optimally achieved by increasing the frequency.

In shuggling the mixture 48, the polyethylene 12 and polypropylene 14 will separate with the heavier polyethylene 12 moving to the base 28 of the vessel 18 and the lighter polypropylene 14 moving to top of the vessel 18. Each layer of plastic material will include both the 2D and 3D flakes. A layer of segregation media 24 will be left between the plastic layers. This separation step 50 allows the polyethylene 12 flakes to be first drawn off through an outlet 68 at the base 28 of the vessel 18. The segregation media 24 can also be drawn off and filtered for re-use. Finally the polypropylene 14 can be drawn off. The polypropylene 14 and polyethylene 12 may then be washed, if desired before being batched-up and transported to a suitable plastics site for manufacture into new goods.

While this describes the process for two polymers, the separation process for the present invention can be used on more than two materials. The lightest will go up, the heavier will go down. Therefore, if we have three polymers PP, LLDPE and HDPE, for example, the PP and LLDPE will go up and the HDPE down. We then separate these two streams and then do a separate step to separate PP and LLDPE.

As has been detailed above, the amplitude and frequency of oscillation of the baffle and the design of the discs can be optimised to improve separation. A further feature which can be used is in controlling the flow of the segregation media through the vessel.

If we consider a mixture of polymers in a column of water as an example. When we shuggle the mixture, the polymer stack will rise but still separate with the lighter polymer ending up on top. If, however, we then apply a counter current of water, in this case from top to bottom by putting water in at the top of the vessel and draw it off the bottom of the vessel, then the water flow will drive the heavier particles down. By carefully controlling the flow of water, we can more easily separate the heavy from light polymers. It is the velocity of the water flow through the vessel which is controlled. The separated polymers are taken off in order. In this case the water flow down the vessel can be used to sweep the polymer out of the bottom of the vessel (in the case of light polymers).

The reverse will also work if we have a mixture of polymers with a density greater than water. In this case water if flown up the vessel at a rate needed to get the lightest of the 'heavy' polymers to rise.

The process with water control may also be used to perform three separations in a single vessel. For example, PP & HDPE (lighter than water) and ABS heavier than water. If we shuggle the mixture of three polymers with water as the segregation media and set-up a downward water flow through the vessel, the PP ends up at the top of the vessel. HDPE and ABS are swept down. HDPE can be swept away in the water flow but ABS sits on the bottom and can be withdrawn reasonably pure.

The inventors found the combination of controlling the flow of the segregation media through the vessel with shuggling provided an unexpected result.

The process 10 is also suitable for the separation of valuable minerals and metals from the waste minerals upon ores extraction. Ore is a term used to describe an aggregate of minerals from which a valuable constituent, especially a metal, can be profitably mined and extracted. Most rock deposits contain metals or minerals, but when the concentration of valuable minerals or metals is too low to justify mining, it is considered a waste or gangue material. Within an ore body, valuable minerals are surrounded by gangue and it is the primary function of mineral processing, to liberate and concentrate those valuable minerals.

The process 10, is as detailed in the previous Figures with the mixture 16 being ore including a first material 12 of at least one valuable mineral and a second material 14 being the undesirable gangue material. The mixture 16 may be pre-sorted 44 visually and then fed through a crushing process to provide fine particles, such as a powder. The materials 12 and 14 will have distinct densities, both being relatively high. The segregation media 24 is water. While this has a lower density than both materials 12,14 the present invention can achieve separation of the materials in contrast to the prior art arrangements. Water also provides a cheaper process.

The process steps are followed as detailed in FIG. 3. The shuggling step 48 has a number of variables and the separation 50 is made possible by controlling these variables. The variable are: the disc design; the energy introduced to system i.e. the frequency and the amplitude; the spacing of discs and the speed of water recirculation.

Figure 4:
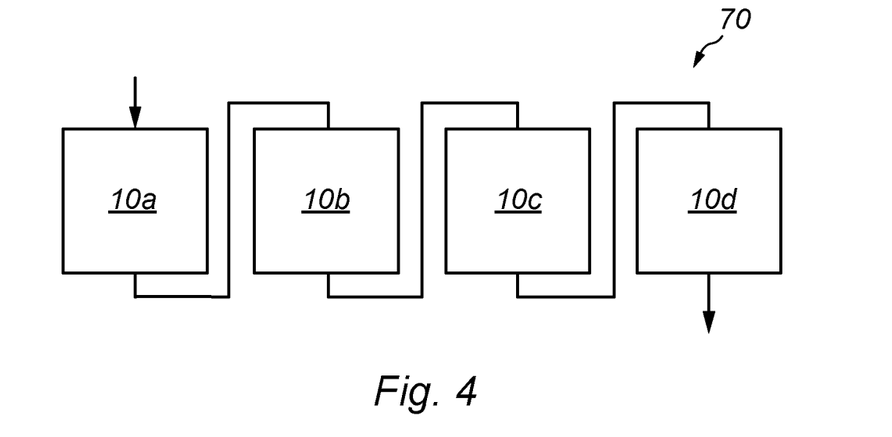
FIG. 4 is a diagrammatic view illustrating the steps in a process to separate materials according to a further embodiment of the present invention.

Reference is now made to FIG. 4 of the drawings which illustrates a cascaded system, generally indicated by reference numeral 70, according to an embodiment of the present invention. System 70 comprises a number of vessels in a cascaded arrangement to provide separate segregation systems 10a-d which each process a plastics mix 16 and a segregation media 24 to separate out chemically different materials. In this arrangement 70, the density of the segregation media can be selected to lie between those plastics which will be produced and those which will be moved on for further segregation at a later system 10a-d. Thus the segregation media will be varied for each vessel. Each vessel will have a baffle structure 30 as described herein with reference to FIGS. 1 and 2 and each system will operate as described herein with reference to FIG. 3. The variables for each vessel can be separately controlled to provide the most efficient conditions depending on the mixtures being separated at each stage.

Such cascaded arrangements can also be used to separate a mixture of more than two materials using water as the segregation media and controlling it's flow through the series of vessels as described hereinbefore. Therefore we can separate a complex mixture of materials, for example, a mixture of PP/LLDPE/HDPE/ABS/HIPS/PVC.

Shuggling the entire mixture with water in vessel 1 and circulating the water can give: pure PP out of the top of the vessel; LLDPE/HDPE swept out of the bottom of the vessel in the water flow and directed to vessel 2; and, ABS/HIPS/PVC withdrawn from the bottom of the vessel and directed to vessel 3. Using vessel 2 to separate LLDPE/HDPE, shuggling in water produces pure LLDPE out of the top of the vessel and pure HDPE out of the bottom of the vessel. Finally, using vessel 3, shuggling with controlled water flow gives: ABS out of the top of the vessel; HIPS swept out of the bottom of the vessel; and, PVC withdrawn from the bottom of the vessel.

It will be recognised by those skilled in the art that other variations to separate this complex mix may be applied such as drawing PP/LLPDE from the top of vessel 1 to vessel 2 and having HDPE swept from the bottom of vessel 1 as pure. Then at vessel 2, separating the PP/LLDPE as pure. The variation selected may be dependent on the materials in the mixture.

Figure 5:
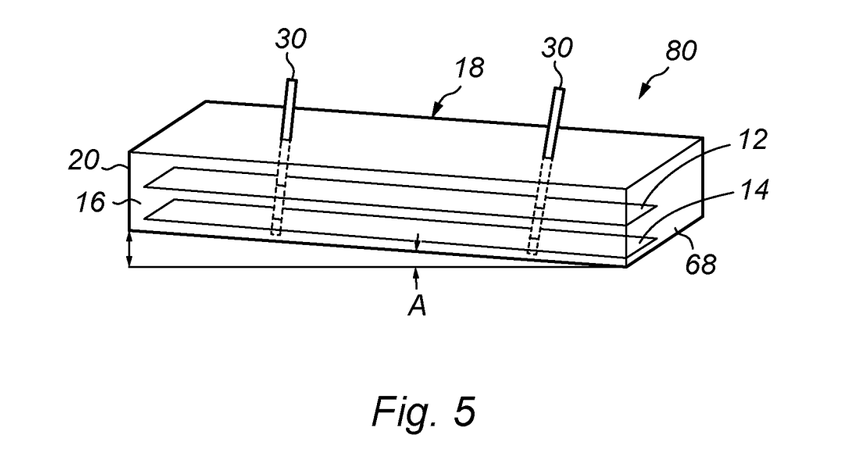
FIG. 5 is a schematic illustration of a vessel including a plurality of baffle structures for use in a process for separating materials according to an embodiment of the present invention.

Reference is now made to FIG. 5 of the drawings which illustrates an alternative apparatus to that of FIG. 4, generally indicated by reference numeral 80, according to an embodiment of the present invention. Apparatus 80 comprises a long horizontal tank-like vessel 18 in which is arranged an array of baffle structures 30 along its full length. They may also be arranged across the vessel 18 width, if desired. Each baffle structure 30 is as described herein with reference to FIGS. 1 and 2 and the process 10 will operate as described herein with reference to FIG. 3. At the input 20, a mixture 16 and a segregation media 24 is introduced in a continuous system, with the output of each baffle structure being the input to the adjacent baffle structure between the input 20 and the output 68. Each baffle structure may be identical with identically controlled variables or may vary to as the mixture 16 and segregation media 24 pass from the input 20 to the output 68. At the output 68, separate ports may be arranged at the different heights of the vessel to separately pump-out the materials 12,14 and the segregation media 24.

The process 10 can be run continuously, semi-continuously or batch-fed.

The principle advantage of the present invention is that it provides a process for the separation of a mixture of materials of chemically different type which have approximately the same density range by shuggling.

A further advantage of the present invention is that it provides a process for the separation of a mixture of materials of chemically different type using a segregation media which is higher or lower in density than the density of the materials being separated by shuggling.

A yet further advantage of at least one embodiment of the present invention is that it provides a process for the separation of a mixture of any materials of chemically different type using water as a segregation media by shuggling and controlling the flow of water through the mixture.

A yet further advantage of at least one embodiment of the present invention is that it provides a process for separating polyethylene and polypropylene.

A still further advantage of at least one embodiment of the present invention is that it provides a process for separating minerals from ore.

It will be appreciated by those skilled in the art that modifications may be made to the invention herein described without departing from the scope thereof. For example, various other structures can be mounted on the shaft to create the baffle structure as long as it achieves a surface area for interacting with the vessel contents and leaves a passageway for the plastics to pass through. Additionally, though the vessel is presented in a vertical arrangement, the process will still work where the vessel is tilted or arranged horizontally. Though only examples have been described for the waste plastics and mineral extraction industries, the process may find use in other industries such as pharma and food.

The invention claimed is:

1. A process for the separation of materials in a mixture of materials, comprising:
   a.) introducing a mixture of at least two materials of chemically different type into a vessel;
   b.) introducing a segregation media to the vessel;
   c.) without rotation of said vessel, oscillating a centrally located baffle structure in the vessel longitudinally on its own central axis at a first frequency and a first amplitude, without rotation of said baffle structure about said central axis, and wherein said baffle structure comprises a central shaft upon which are located a plurality of discs, the discs including one or more pathways therethrough for the passage of vessel contents; and
   d.) causing shuggling in the vessel through the oscillating baffle structure so as to result in separation of the at least two materials within the vessel, and removing the separated materials from the vessel.

2. A process according to claim 1 wherein the segregation media is circulated through the vessel.

3. A process according to claim 2 wherein the segregation media is circulated in a first direction and at a first velocity.

4. A process according to claim 1 wherein the segregation media is a fluid.

5. A process according to claim 4 wherein the segregation media is water.

6. A process according to claim 1 wherein the mixture includes at least a first material having a first density in a first density range and at least a second material having a second density in a second density range, the first and second density ranges overlap and the segregation media has a density within the overlap.

7. A process according to claim 6 wherein the materials include polyolefins polyethylene (PE) and polypropylene (PP).

8. A process according to claim 1 wherein the mixture includes at least a first material having a first density in a first density range and at least a second material having a second density in a second density range, the first and second density ranges are distinct and the segregation media has a greater density than the first and second density ranges.

9. A process according to claim 1 wherein the mixture includes at least a first material having a first density in a first density range and at least a second material having a second density in a second density range, the first and second density ranges are distinct and the segregation media has a lower density than the first and second density ranges.

10. A process according to claim 1 wherein the mixture includes metals.

11. A process according to claim 10 wherein the mixture is ore.

12. A process according to claim 1 wherein the segregation media is degassed prior to introduction into the vessel.

13. A process according to claim 4 wherein the baffle structure is oscillated by use of a motor located at an end of the shaft.

14. A process according to claim 1 wherein there is a plurality of vessels arranged to provide cascaded segregation.

15. A process according to claim 1 wherein there is a plurality of baffle structures in a single vessel.

16. A process according to claim 1 wherein the process includes means for removing a separated material from the vessel.

* * * * *